United States Patent [19]

Dickey

[11] Patent Number: 5,531,312
[45] Date of Patent: Jul. 2, 1996

[54] APPARATUS AND METHOD FOR SINGULATING ARTICLES

[76] Inventor: Daniel M. Dickey, 2755 Verde Valley School Rd., Sedona, Ariz. 86351

[21] Appl. No.: 327,955

[22] Filed: Oct. 24, 1994

[51] Int. Cl.⁶ ............................................. B65G 47/12
[52] U.S. Cl. .................. 198/450; 198/471.1; 198/481.1; 198/958
[58] Field of Search .................. 198/397, 418.5, 198/450, 478.1, 471.1, 481.1, 689.1, 443, 453, 525, 534, 550.01, 958

[56] References Cited

U.S. PATENT DOCUMENTS

| | | | |
|---|---|---|---|
| 2,739,695 | 3/1956 | Haycock | 198/958 X |
| 3,404,059 | 10/1968 | Ritterhoff | |
| 3,690,997 | 9/1972 | Bofinger et al. | |
| 3,715,056 | 2/1973 | Preston | 198/471.1 X |
| 3,783,058 | 1/1974 | Solomon et al. | |
| 3,887,059 | 6/1975 | Verjux | 198/450 |
| 3,957,152 | 5/1976 | Heitmann | 198/471.1 X |
| 3,968,901 | 7/1976 | Peva, Jr. | |
| 4,003,277 | 1/1977 | Oesterling | 198/450 X |
| 4,296,660 | 10/1981 | Cristiani | 198/450 X |
| 4,657,130 | 4/1987 | Ackley, Jr. et al. | 198/397 |
| 5,454,464 | 10/1995 | Yamamoto et al. | 198/397 X |

FOREIGN PATENT DOCUMENTS 1935017  1/1987  Germany.

*Primary Examiner*—D. Glenn Dayoan
*Attorney, Agent, or Firm*—Lothrop & West

[57] ABSTRACT

An apparatus and method for singulating individual articles from a group of articles. A rotary vacuum wheel includes a plurality of article pockets in its outer edge periphery. Apertures within each pocket are in communication with a vacuum pump. An article collection bin has a lower discharge port, through which a portion of the wheel periphery passes. The attractive vacuum forces draw individual articles into a respective pocket where they are secured. Continued rotation of the wheel transports the singulated articles to a discharge station, for further processing, such as labeling, counting, or packaging.

16 Claims, 5 Drawing Sheets

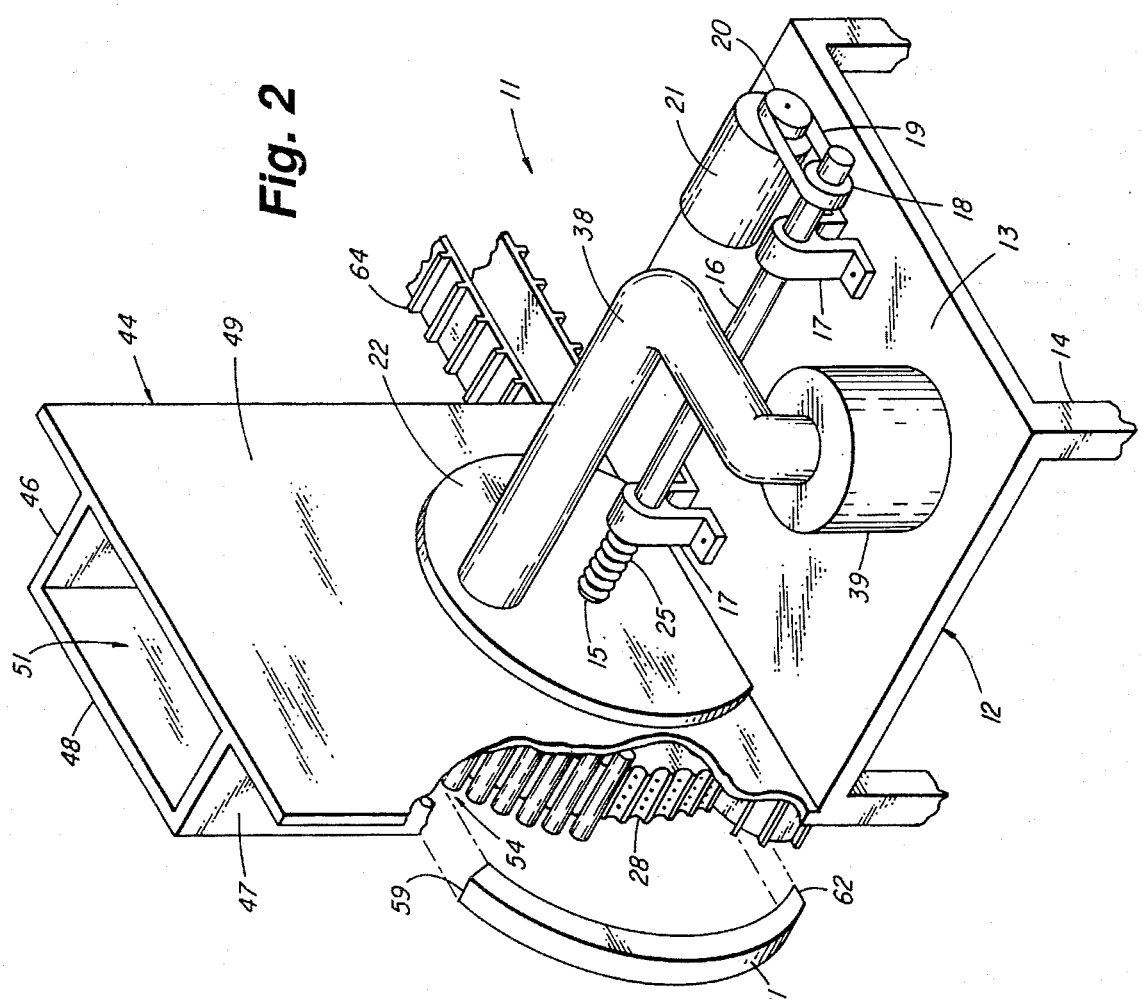
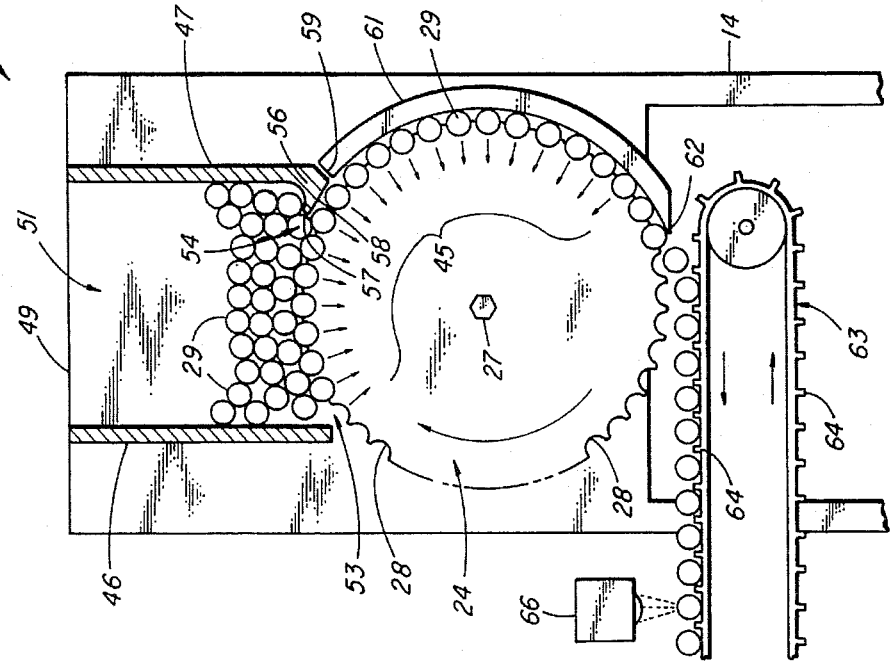

APPARATUS AND METHOD FOR SINGULATING ARTICLES

FIELD OF THE INVENTION

The invention relates generally to the art of article handling and processing machines. More specifically, the invention pertains to devices and methods adapted to segregate, or singulate, individual articles from a plurality of grouped articles, for purposes of labeling, packaging, or counting the singulated articles.

BACKGROUND OF THE INVENTION

Articles such as batteries, crayons, pencils, beverage containers, film canisters, and the like, are typically right-circular, cylindrical and elongated in configuration. After these articles are manufactured using modern, mass production techniques, they are collected or grouped together in a bin, or transported on a conveyor, to another location for further processing. This processing may include: (1) labeling or other application of product name or brand identification upon the articles; (2) counting predetermined package numbers, or entire production numbers, of the articles; and, (3) packaging or containerizing the articles. For this purpose, it is desirable to provide some means for physically segregating, individual ones of the articles from the grouped production articles, so that they may individually be further processed, in the required manner.

Manual techniques for such segregation have been replaced by automated devices, capable of operating at relatively high speeds in unattended fashion. For example, the inventor herein is aware that a rotary wheel, having pockets on its periphery, including permanent magnets therein, has been proposed to singulate cylindrical metal containers. Specific details of the proposed construction are not known, but it is believed that such a device would be ineffective to singulate non-metallic containers, made of plastic or glass material, and would further require an active extractor to remove articles from the grip of the magnets within the pockets.

The inventor herein is also aware that a device for singulating articles such as crayons has been proposed, in which a grouping bin having a discharge throat sized and configured to pass a single crayon is employed. Owing to the physical limitations imposed by this singulation technique, it is believed that this device cannot run at the desired high speeds, and may further be susceptible to jamming.

SUMMARY OF THE INVENTION

The present invention is designed preferably to capture single, elongated cylindrical articles from a group of such articles, and pass the captured, singulated articles on to a conveyor, or the like, for further processing. A rotary vacuum wheel is provided, having a plurality of article pockets in its outer edge periphery. The pockets are sized and configured to accommodate at least a portion of the outer, cylindrical sidewall of a respective article. Each pocket also has at least one vacuum aperture in its inner sidewall. Through a predetermined rotational phase of the vacuum wheel, this aperture is interconnected to the inlet of a vacuum pump. This selectively provides a strong, attractive vacuum force, for drawing individual articles within a respective article pocket.

To establish and maintain a group of articles ready for singulation, an article collection bin is provided. The bin has opposing sidewalls, and opposing front and rear walls spaced so as to accommodate the length of the articles, between the front and rear walls. The articles are delivered into the bin, and arranged with their axes parallel and their adjacent sidewalls in substantially contingent relation. The bin also includes an article discharge port, through which a peripheral portion of the vacuum wheel passes. The discharge port is at least as wide as the transverse dimension of two articles, although typically more, so that at any given moment, a plurality of articles is exposed to the attractive forces of the vacuum.

As each article adjacent the vacuum wheel is captured within a pocket, another article from the group is forced toward the vacuum wheel and drawn into the next available empty pocket. In this manner, rapid, smooth, and continuous singulation of the articles is effected. The singulated articles are transported by the rotary action of the wheel to a discharge station, whereupon they are released from a respective pocket and subjected to the desired further processing.

BRIEF DESCRIPTION OF THE DRAWINGS

FIG. 1 is a front elevational view of the singulating device with the article collection bin in cross-section, and further showing the rotary vacuum wheel and a downstream transport conveyor;

FIG. 2 is a rear isometric view of the device, with the article guide pulled away and a portion of the frame broken away, to reveal articles captured in the vacuum wheel pockets;

DETAILED DESCRIPTION OF THE PREFERRED EMBODIMENT

Figure 3:
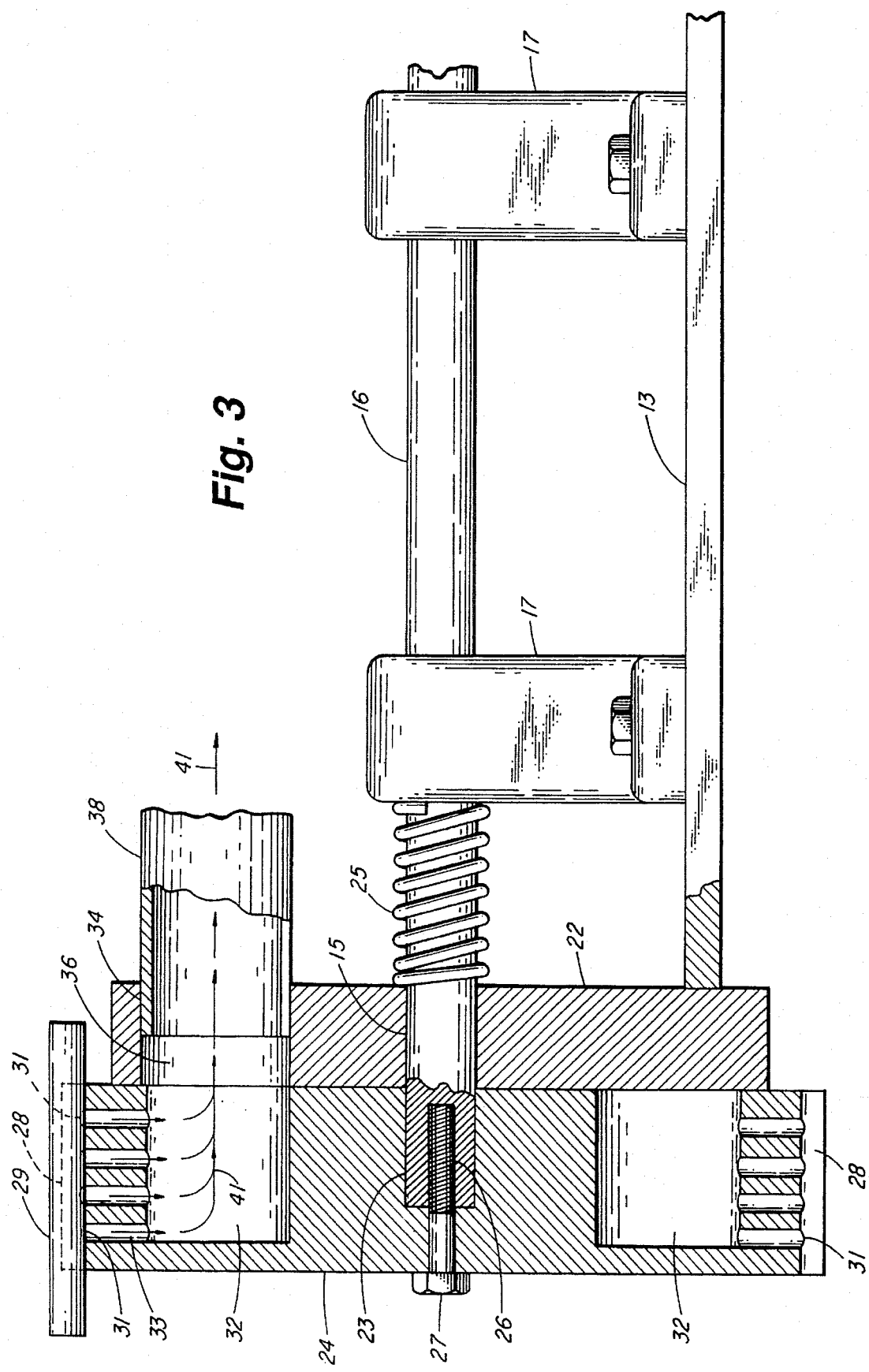
FIG. 3 is a fragmentary cross-sectional view of the vacuum wheel and the vacuum valve assembly, also showing components of the wheel drive shaft.
Figure 4:
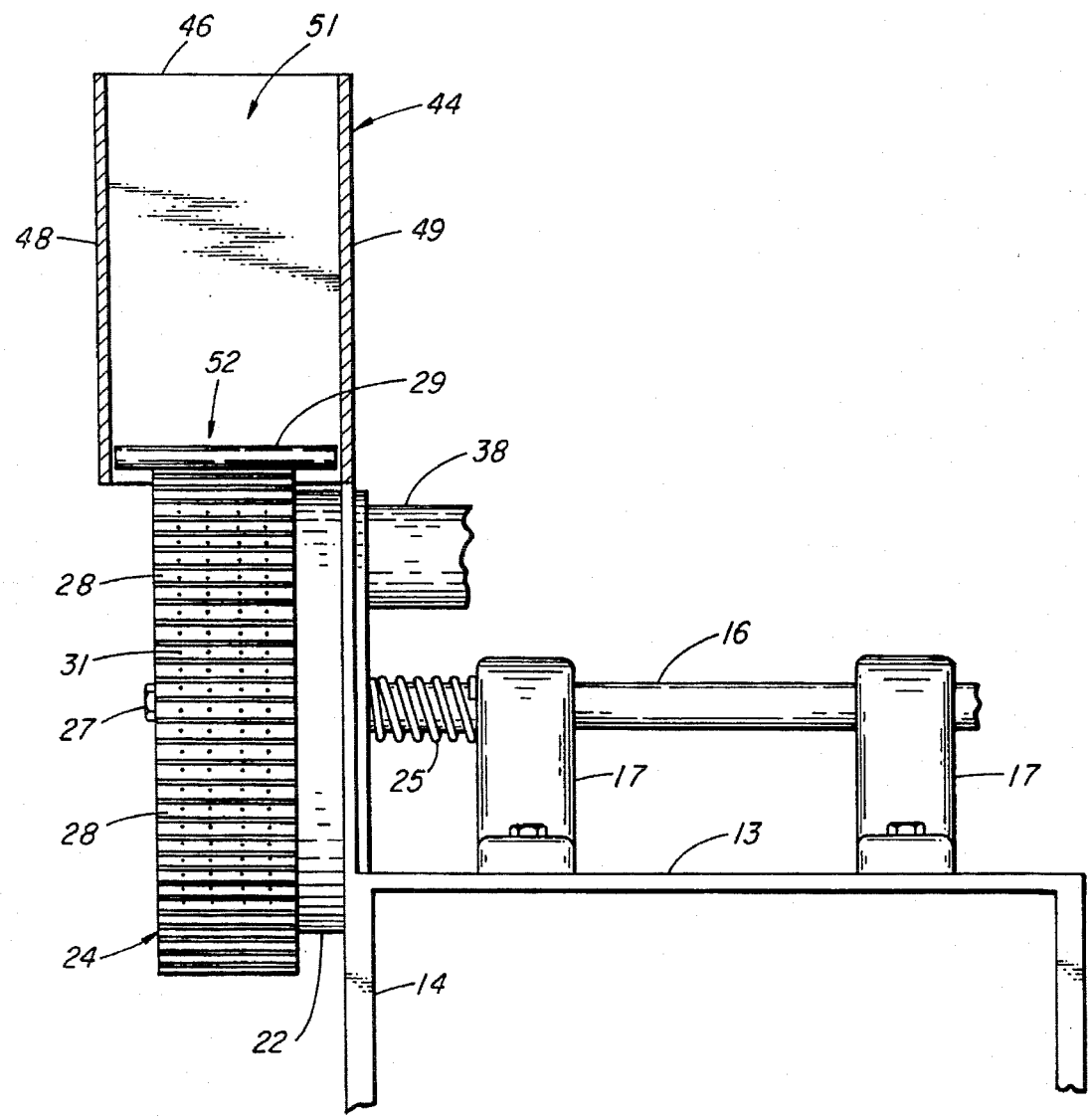
FIG. 4 is a fragmentary, side elevational, cross-sectional view of the device, taken transversely through a portion the discharge port, showing for illustrative purposes, a single article captured by the vacuum wheel passing therethrough.
Figure 6:
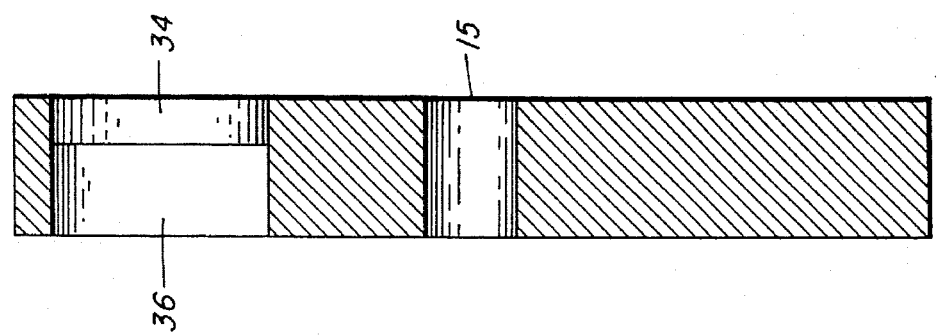
FIG. 6 is a cross-sectional view, taken on the line 6—6, shown in FIG. 5.

Turning now to FIGS. 1 and 2, the singulating apparatus 11 of the present invention is shown. A frame 12 is provided, having a planar base 13 and supportive legs 14. Drive shaft 16 is mounted for rotation about its axis 13 by means of front and rear pillow block bearings 17. A shaft pulley 18 is included on the rearward end of shaft 16, and a belt 19 interconnects pulley 18 with a drive pulley 20 on a variable speed, electric motor 21. Conventional control circuitry (not shown) is preferably included for motor 21, so that its speed, and the corresponding rate of rotation of shaft 16, can be determined either independently by an operator, or automatically in synchronism with the operation of other infeed or downstream mechanisms.

The forward portion of shaft 16 is freely journaled through a bore 15 in the center of stationary vacuum valve 22, terminating in a blind hole 23 within the center of rotary vacuum wheel 24. Threads 26 are provided in the forward end of the shaft, for engagement by bolt 27. In this manner, wheel 24 is securely attached to shaft 16 for rotation therewith about a common axis. A key on the shaft and a keyway in the wheel 24 (not shown), may be included for positively locking the wheel in a particular rotational position with respect to the shaft.

A spring 25 is included over shaft 16, between the rearward face of valve 22 and the opposing face of the forward bearing 17. This spring provides an appropriate bias force between the forward face of valve 22 and the rearward face of wheel 24. A sufficient amount of force must be present so that a reasonably good vacuum seal is provided between these two abutting faces. At the same time, the frictional forces between rotary wheel 24 and the stationary valve 22 must be controlled so that wheel 24 can be accelerated rapidly, and rotated freely at high speeds.

Wheel 24 includes at least one article pocket 28 within its outer periphery. Depending upon the requirements of the application, the number of pockets on the wheel 24 may vary from a single pocket to a plurality of adjacent pockets, extending entirely around the wheel as disclosed in the preferred embodiment. As an intermediate design, it may be desirable to provide, say, four pockets, spaced equally, every 90 degrees, about the periphery of the wheel 24. With any of these designs, the speed and rotational position of wheel 24 may be synchronized with the speed and translational position of a downstream article conveyor.

Pockets 28 are preferably sized and configured to accommodate a single article 29, so that a portion of the article's sidewall may rest in contingent relation with at least a portion of the pocket sidewall. However, it is contemplated that the pockets may also be sized to house or embrace a plurality of articles, as will be described more fully below. The length of each pocket 28 is typically only a portion of the entire length of an article, as shown in FIG. 3. In other words, front and rear portions of the article 29 extend frontwardly and rearwardly beyond the pocket 28.

The articles 29 are typically right-circular, cylindrical and elongated in configuration, such as beverage cans, pharmaceutical containers, batteries, crayons, tubes, pencils, or the like. However, the invention is not limited in any way for use with specific articles. For example, the articles may be metallic or non-metallic, heavy or light, filled or empty.

Moreover, it is not necessary for the articles to be right-circular cylindrical in configuration, to be singulated by the invention herein. The articles may have multi-faceted sidewalls, presenting four, five or six sidewall faces, by way of example. Or the articles could be spherical or ellipsoidal in configuration. It may prove advantageous, for certain of these article sidewall configurations, to modify the pocket configurations accordingly. Thus, an article which is hexagonal in cross-section, may call for the use of a pocket having an inner sidewall which is multi-faceted, rather than curved in configuration. Other appropriate pocket modifications would be obvious to one of ordinary skill in the art.

Figure 8:
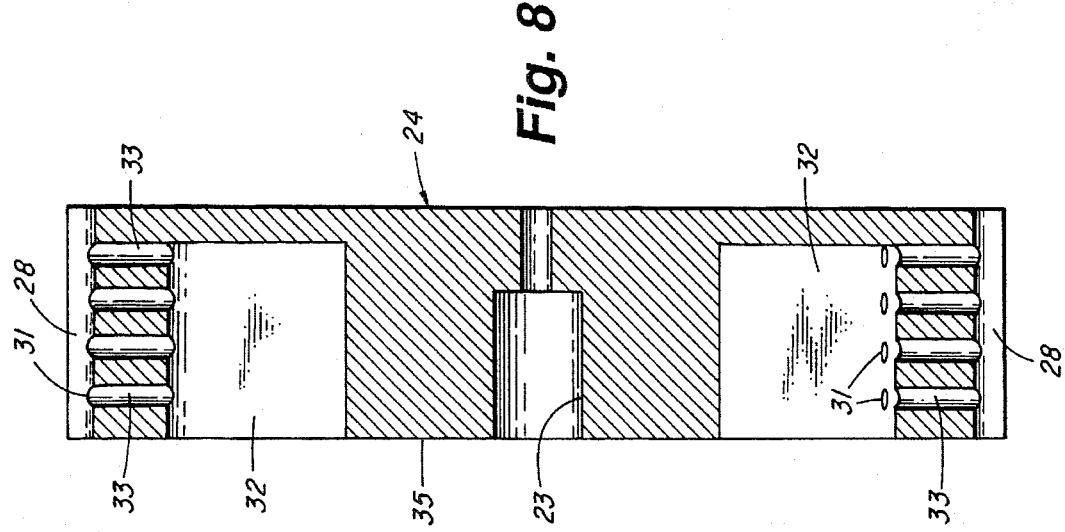

Each pocket 28 preferably includes a plurality of vacuum apertures 31, within the pocket's sidewall. The number and size of these apertures depends upon such factors as the weight, number, and configuration of the articles 29 to be singulated, the length of the pocket 28, and the maximum design speed of the singulating device herein. For purposes of disclosing the preferred embodiment, I have included four such apertures in collinear relationship, as shown most clearly in FIGS. 3 and 8. If the pocket 28 were sized to hold, say, three articles 29, then plural apertures, radially spaced around the inner sidewall of the pocket, could be employed.

Figure 7:
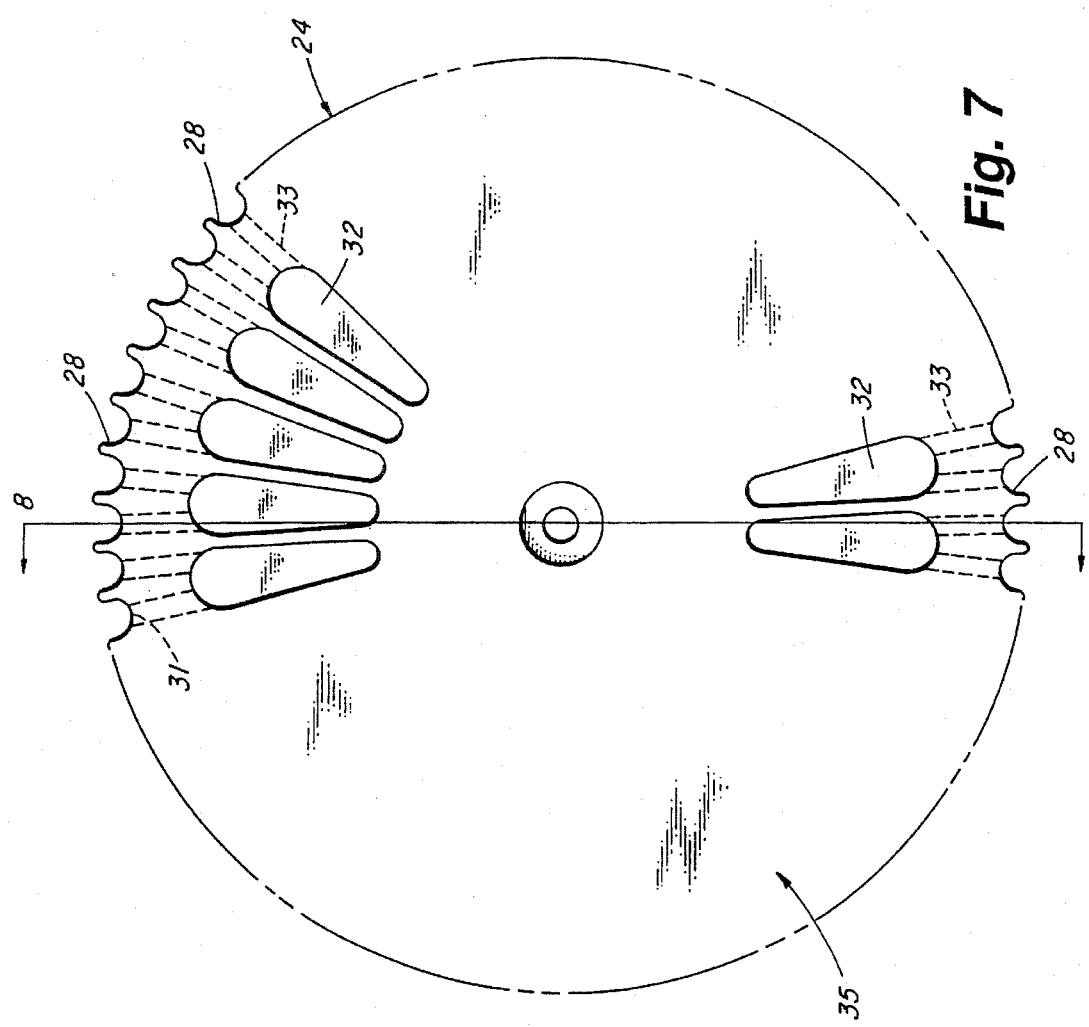
FIG. 7 is a fragmentary, rear elevational view of the rotary vacuum wheel, showing a representative sample of the article pockets and the vacuum plenums, with interconnecting vacuum passageways being depicted in broken line; and, FIG. 8 is a cross-sectional view, taken on the line 8—8, shown in FIG. 7.

Each aperture is connected to a teardrop-shaped vacuum plenum 32, by means of a respective passageway 33. Each plenum 32 extends forwardly, from a rear face 35 of the wheel 24, to the forwardmost passageway (see FIGS. 7 and 8). A plurality of such plenums is radially arranged about the axis of wheel 24, so that each plenum is in communication with the vacuum apertures 31 within a pair of pockets 28.

Figure 5:
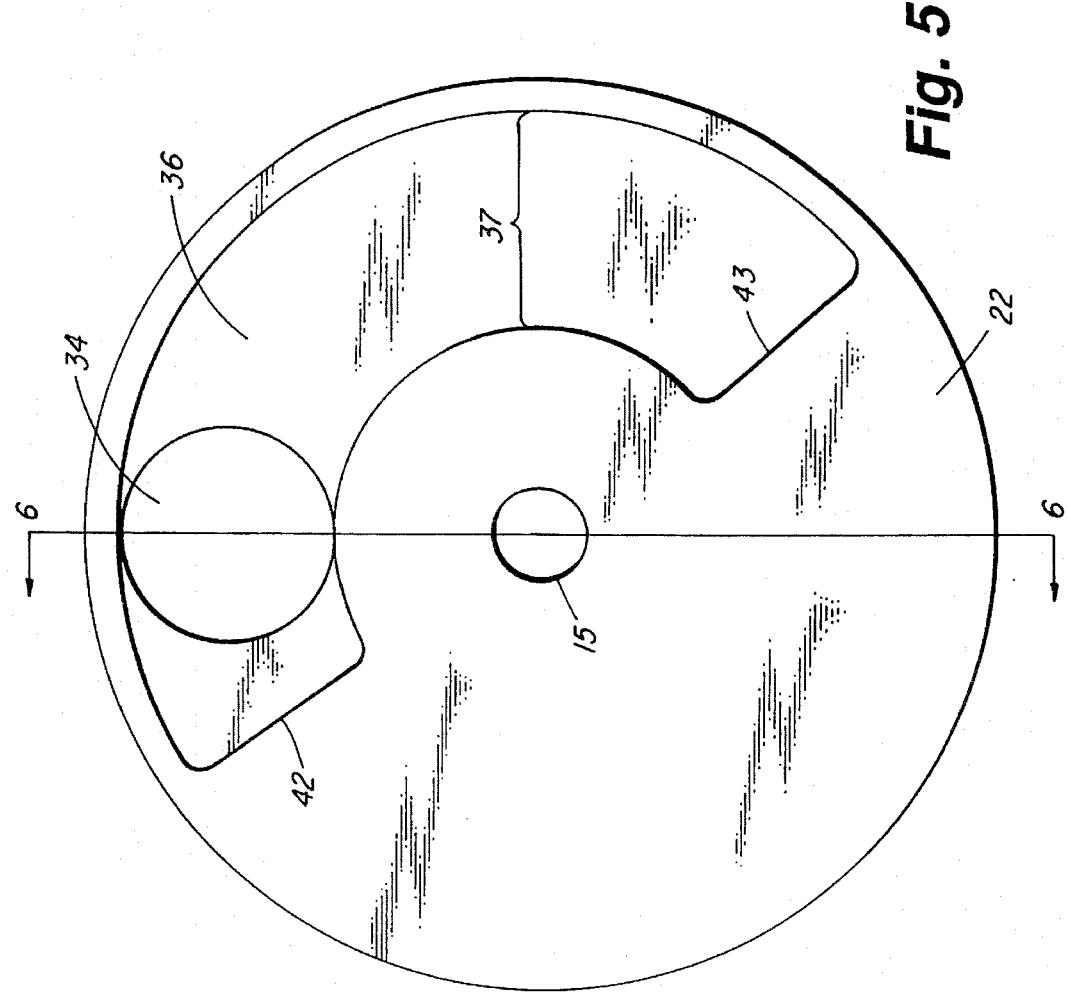
FIG. 5 is a front elevation view of the vacuum valve, showing the vacuum port and the vacuum chamber.

Vacuum valve 22 is provided with a vacuum port 34, in communication with an arcuate vacuum chamber 36. As is shown most clearly in FIG. 5, the vacuum chamber 36 consists of an arcuate recess in the forward face of valve 22, having a predetermined size, configuration, and location. Chamber 36 has a transverse aspect 37 which corresponds in size and radial location to the rearward, open portion of an adjacent plenum 32 in the wheel 24. A vacuum line 38 interconnects port 34 with a vacuum pump 39, mounted on the rear portion of base 13. The size of pump 39 is not particularly critical, but it must be capable of providing sufficient vacuum to ensure rapid and positive capture of articles, in a manner to be described more fully below.

It will be appreciated that depending upon the rotational position of wheel 24, individual ones of the plenums 32 will be in communication with the vacuum chamber 36, thereby applying vacuum provided by the pump to respective ones of the apertures 31. For example, in FIG. 3, when plenum 32 is in register with chamber 36, an air flow, represented by flow line 41, passes through apertures 31 to pump 39.

The predetermined leading end 42 and trailing end 43 of chamber 36, determine how many and which of the plenums 32, and respective apertures 31, are to be subjected to vacuum forces at any given moment. Making particular reference to FIG. 5, it is evident that just as an individual plenum 32 first encounters the leading end of chamber 36, vacuum will be applied through the eight passageways 33 to respective apertures 32. And, vacuum forces will continue within those apertures, until the referenced plenum is rotated past the trailing end 43 of chamber 36. In this way, vacuum is selectively applied within particular article pockets 28, to effect the singulation process herein.

An article collection bin, or hopper 44 is provided, to establish and maintain a group of articles 29, ready for singulation. Bin 44 includes opposing sidewalls 46 and 47, and opposing front wall 48 and rear wall 49. Sidewalls 46 and 47 may be vertical and parallel, as shown in the drawings, or they may be downwardly inclined and converging, or a combination thereof. The front and rear walls are maintained in parallel, spaced relation, preferably slightly farther apart than the length of the articles to be singulated.

The upper ends of the sidewalls, together with the upper ends of the front and rear walls, define an article infeed port, or zone 51. Articles 29 are delivered through the port 51 into the bin 44, and arranged therein as a group, with their axes parallel and their adjacent sidewalls in substantially contingent relation (see FIG. 1).

An article discharge port, or zone 52 is also provided at the lower portion of bin 44. The peripheral portion of rotary wheel 24 passes through port 52, from an entry side 53 to an exit side 54, so that the articles 29 therein are exposed to the attractive vacuum forces within each pocket 28. These forces are represented by arrows, identified collectively by the numeral 45, in FIG. 1.

The depth of port 52 corresponds to the front wall to rear wall dimension of the bin 44; the width of port 52 is at least as great as the transverse dimension of two articles, side by side. Preferably, however, the port 52 is wide enough to accommodate, say, five to ten articles, to ensure that at all times, a plurality of articles within the port is exposed to the pockets 28.

As discussed above, the vacuum valve 22 is designed to apply vacuum forces to apertures 31, just before the pockets 28 enter the port 52. Under force of gravity, the articles 29 are forced down into the port 52, for capture by vacuum forces, within a respective pocket 28. Since the pockets 28 are right-circular cylindrical in configuration, and preferably sized just slightly larger than the articles, a very positive and secure capture of the articles is effected. As the width of the port 52 from entry side 53 to exit side 54 is increased, the residence time of a particular pocket within the port is increased, as well. With the preferred embodiment shown herein, operating at speeds on the order of 1200–1500 articles per minute, it has been determined that virtually all of the pockets have captured an article by the time they exit the discharge port 52.

Although the preferred embodiment relies upon gravitational forces to urge articles into the discharge port 52, it should be noted that alternate means may be employed. For example, rotary wheel 24 could be reoriented with its axis of rotation vertical. Then, in lieu of the vertically extending bin 44, a horizontal conveyor belt with marginal side guides, may conveniently be used to group the articles and maintain them in contingent relation with their axes parallel. Frictional forces developed by the conveyor belt would constantly urge articles into the discharge port 52, for capture within pockets 28.

To ensure reliable operation of the singulator, especially at high speeds and with certain articles, an article separator foot 56 is included within the exit side of the port 52. Separator foot has a leading end portion 57 directed toward the entry side of the port, and a bottom portion 58 spaced from the outermost periphery of wheel 24. The spacing between the portion 58 and the wheel 24 is such that an article 29, captured within a pocket, can pass therebetween without coming into contact with the foot 56. The foot 56 acts to separate out the singulated, captured articles from the group of articles remaining in the bin 44, so that the latter will not dislodge the captured articles from the pockets.

Just downstream from the exit side of the discharge port is the entry end 59 of an arcuate article guide 61. The guide 61 is spaced from and concentric with rotary wheel 24, and adapted to maintain articles 29 within their respective pockets. Article guide 61 may be provided as extra protection to assure that articles are not prematurely dislodged, in the event that centrifugal forces generated by the rotation of wheel 29 overcome the vacuum forces within the article pockets. For example, with heavier articles and with the wheel rotating at higher speeds, such a situation may arise.

Alternatively, it may be desirable to terminate vacuum chamber 36, close to the exit side of the discharge port 52. Such a modification would naturally produce higher vacuum forces within the remaining pockets, but would also release the articles from the pockets just downstream from the exit side 54. Either, the articles could immediately be discharged to a conveyor, or article guide 61 could be employed to maintain the articles in the pockets through further rotation of the wheel 24.

In the preferred embodiment, both the extended vacuum chamber 36 and the article guide 61 are used, as shown most clearly in FIG. 1. The guide as depicted, also includes an exit end 62, from which articles are released and discharged onto a conveyor 63. The outer surface of conveyor 63 includes parallel flights 64, spaced from each other so as to accommodate a single article. The drive mechanism (not shown) for the conveyor, and the control circuitry for the motor 21, may be synchronized, both with respect to position and speed. Thus, as an individual article is released from exit end 62, it is deposited within a respective space between adjacent flights 64, and this operation is maintained over a wide range of speeds.

It may also be desirable to have an electro-optical article counter 66, directed toward the articles on the conveyor, to count entire production numbers, or to establish groups or batches of predetermined numbers of articles for packaging or the like. The specific location and type of counter employed, is an obvious design choice.

After the articles have been singulated and segregated from each other, as described above, they may be labeled, containerized, or otherwise processed as desired.

What is claimed is:

1. An apparatus for singulating articles having an axis, comprising:
   a. an article hopper for confining a plurality of the articles, said hopper having opposing front and rear walls, opposing side walls spanning said front and rear walls, an upper inlet port, and a lower discharge port, said lower discharge port having a width between an entry side and an exit side sufficient to accommodate at least two articles therein with their axes parallel to said side walls;
   b. a rotary wheel, having a peripheral, outer edge portion thereof, rotating through said lower discharge port from said entry side to said exit side, thereof, said wheel having at least one article pocket along said peripheral edge portion, said pocket having at least one aperture therein;
   c. vacuum means, operably connected to said aperture, at least when said article pocket is passing through said lower discharge port, for capturing a respective one of the articles within the pocket;
   d. an article separator foot within said exit side of said lower discharge port, said foot having a leading end portion directed toward said entry side and having a bottom portion spaced from said wheel so as to allow an article captured within a pocket to pass therebetween.

2. An apparatus as in claim 1 further including an arcuate article guide, said guide being concentric with said rotary sheel and spaced a predetermined distance from its outer periphery so as to confine an article captured with said pocket.

3. An apparatus as in claim 1 in which said articles are elongated and right circular cylindrical in configuration, and in which said pocket is arcuate and sized so as to accommodate said articles.

4. An apparatus as in claim 1, in which said vacuum means includes a stationary vacuum valve having a recess in a front face thereof, and a vacuum pump in communication with said chamber, and in which said rotary wheel has a vacuum plenum in a rear face thereof, said plenum being in communication with said aperture, and said front face and said rear face are in abutting relationship, so that as said wheel rotates, said plenum and said recess are selectively in communication, thereby applying vacuum to said aperture.

5. An apparatus as in claim 1, including a plurality of said article pockets, each of said pockets including respective apertures therein operably connected to said vacuum means at least when respective ones of said pockets are passing through said discharge port.

6. A method for singulating articles, having a longitudinal axis and sidewalls, comprising the steps of:
   a. arranging a plurality of articles in a group with their adjacent sidewalls in substantially contingent relation and their respective axes parallel;
   b. providing a discharge zone along one side of said group, including at least two of the articles therein;
   c. providing a rotary wheel having at least one article pocket on its outer periphery, and continuously rotating said wheel with said outer periphery passing through said discharge zone;
   d. providing an article separator foot within said discharge zone, said foot having a leading end portion oriented in a direction against the continuous direction of rotation of said wheel, said foot having a bottom portion spaced from said wheel so as to allow an article captured within said pocket to pass therebetween;
   e. providing vacuum within said article pocket as it passes through said discharge zone, the vacuum and pocket capturing one of the two articles in said discharge zone; and,
   f. transporting the captured article through an arcuate path defined by the rotation of said rotary wheel, to an article discharge station.

7. A method as in claim 6, in which said wheel includes a plurality of article pockets in said outer periphery, and in which the group of articles is constantly urged toward said discharge zone.

8. A method as in claim 6, in which said article pocket is shaped and sized to accommodate at least a portion of the sidewall of an article.

9. A method as in claim 8, in which said article pocket has an axis, said axis being parallel to said longitudinal axis of the articles.

10. A method as in claim 6 in which said article discharge station includes conveyor means for receiving a captured article from said pocket and transporting the article away from said wheel.

11. A method as in claim 7 including means for counting each captured one of said articles.

12. A method as in claim 6 in which the articles are arranged with their axes horizontal, and in which gravity urges the articles toward said discharge zone.

13. A method as in claim 6, in which the sidewalls of the articles are right-circular cylindrical in configuration.

14. A method as in claim 8, in which the sidewalls of the articles are right-circular cylindrical in configuration.

15. An apparatus for singulating articles having an axis, comprising:
   a. an article hopper for confining a plurality of the articles, said hopper having opposing front and rear walls, opposing side walls spanning said front and rear walls, an upper inlet port, and a lower discharge port, said lower discharge port having a width between an entry side and an exit side sufficient to accommodate at least two articles therein with their axes parallel to said side walls;
   b. a rotary wheel, having a peripheral, outer edge portion thereof, rotating through said lower discharge port from said entry side to said exit side, thereof, said wheel having at least one article pocket along said peripheral edge portion, said pocket having at least one aperture therein;
   c. vacuum means, operably connected to said aperture, at least when said article pocket is passing through said lower discharge port, for capturing a respective one of the articles within the pocket;
   d. an article separator foot within said exit side of said lower discharge port, said foot having a leading end portion directed toward said entry side and having a bottom portion spaced from said wheel so as to allow an article captured within said pocket to pass therebetween; and,
   e. an arcuate article guide, said guide having an entry end and an exit end, said entry end of said article guide being adjacent a trailing end portion of said article separator foot, said article guide further being concentric with said rotary wheel and spaced a predetermined distance from its outer periphery so as to confine an article captured within said pocket.

16. An apparatus as in claim 15 including an article conveyor belt adjacent said exit end of said article guide.

* * * * *